United States Patent
Sadri et al.

(10) Patent No.: US 7,653,163 B2
(45) Date of Patent: Jan. 26, 2010

(54) SYSTEMS FOR COMMUNICATING USING MULTIPLE FREQUENCY BANDS IN A WIRELESS NETWORK

(75) Inventors: Ali S. Sadri, San Diego, CA (US); Alexander Maltsev, Nizhny Novgorod (RU); Roman Maslennikov, Nizhny Novgorod (RU); Alexey Khoryaev, Dzerzhinsk (RU); Vadim Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 493 days.

(21) Appl. No.: 11/394,600

(22) Filed: Mar. 31, 2006

(65) Prior Publication Data
US 2007/0091988 A1    Apr. 26, 2007

Related U.S. Application Data

(60) Provisional application No. 60/730,574, filed on Oct. 26, 2005.

(51) Int. Cl.
*H04B 1/10* (2006.01)
(52) U.S. Cl. .................................. 375/349; 375/316
(58) Field of Classification Search .................. 375/316, 375/349
See application file for complete search history.

(56) References Cited

U.S. PATENT DOCUMENTS

| | | | |
|---|---|---|---|
| 5,790,587 A * | 8/1998 | Smith et al. ................ | 375/147 |
| 6,240,290 B1 | 5/2001 | Willingham et al. | |
| 6,603,958 B1 | 8/2003 | Gao et al. | |
| 6,850,741 B2 | 2/2005 | Lei et al. | |
| 6,885,847 B1 | 4/2005 | Lumelsky | |
| 6,954,435 B2 | 10/2005 | Billhartz et al. | |
| 7,119,745 B2 | 10/2006 | Gaucher et al. | |
| 7,170,873 B1 | 1/2007 | Cisar et al. | |
| 7,269,198 B1 | 9/2007 | Elliott et al. | |
| 7,349,436 B2 | 3/2008 | Maltsev et al. | |
| 2002/0086708 A1 | 7/2002 | Teo et al. | |
| 2004/0224719 A1 | 11/2004 | Nounin et al. | |
| 2005/0078707 A1 | 4/2005 | Maltsev et al. | |
| 2005/0095996 A1 | 5/2005 | Takano | |
| 2005/0249151 A1 | 11/2005 | Takano | |

(Continued)

FOREIGN PATENT DOCUMENTS

EP    0952747 A2    10/1999

(Continued)

OTHER PUBLICATIONS

Smulders, Peter, "Exploiting the 60 GHz Band for Local Wireless Multimedia Access: Prospects and Future Directions," IEEE Communications Magazine, Jan. 2002, pp. 140-147.

(Continued)

*Primary Examiner*—Kevin Y Kim
(74) *Attorney, Agent, or Firm*—Schwabe, Williamson & Wyatt, P.C.

(57) ABSTRACT

Systems that communicate in a wireless network using a first and a second frequency band are described herein. The systems may use the first frequency band to transmit or receive a control signal, enabling subsequent communication using the second frequency band.

23 Claims, 9 Drawing Sheets

U.S. PATENT DOCUMENTS

| | | | |
|---|---|---|---|
| 2006/0038658 A1* | 2/2006 | Jarvis et al. | 340/10.1 |
| 2006/0068719 A1 | 3/2006 | Hairapetian | |
| 2007/0099668 A1 | 5/2007 | Sadri et al. | |
| 2007/0232235 A1 | 10/2007 | Li et al. | |
| 2007/0238480 A1 | 10/2007 | Li et al. | |
| 2007/0280332 A1 | 12/2007 | Srikanteswara et al. | |
| 2007/0297365 A1 | 12/2007 | Li et al. | |
| 2008/0085738 A1 | 4/2008 | Li et al. | |
| 2008/0117865 A1 | 5/2008 | Li et al. | |

FOREIGN PATENT DOCUMENTS

| | | |
|---|---|---|
| EP | 1 006 668 A1 | 6/2000 |
| EP | 1056304 A2 | 11/2000 |
| EP | 1 158 686 A1 | 11/2001 |
| EP | 1 261 142 A1 | 11/2002 |
| EP | 1392073 A1 | 2/2004 |
| GB | 23177876 A | 4/1998 |
| GB | 2363256 A | 12/2001 |
| WO | WO9509490 | 4/1995 |
| WO | WO9607108 | 3/1996 |
| WO | WO9922531 | 5/1999 |
| WO | WO2004054153 A2 | 6/2004 |

OTHER PUBLICATIONS

"International Search report and Written Opinion Received," PCT/US2007/080741, (Feb. 4, 2008), pp. 1-10.

Bandyopadhyay, et al., "An Adaptive MAC and Directional Routing Protocol for Ad Hoc Wireless Network Using ESPAR Antenna," ATR Adaptive Communications Research Laboratories, 2000.

Office Action mailed Nov. 6, 2008 from U.S. Appl. No. 11/394,570.
Office Action mailed May 28, 2009 from U.S. Appl. No. 11/394,570.
Office Action mailed Sep. 21, 2009 from U.S. Appl. No. 11/394,570.
Office Action mailed Mar. 5, 2009 from U.S. Appl. No. 11/394,572.
Office Action mailed Sep. 30, 2009 from U.S. Appl. No. 11/394,572.

* cited by examiner 59- 62 GHz Common unlicensed spectrum

400

500

600

700

800

900

SYSTEMS FOR COMMUNICATING USING MULTIPLE FREQUENCY BANDS IN A WIRELESS NETWORK

CROSS REFERENCE TO RELATED APPLICATIONS

The present application claims priority to U.S. Provisional Patent Application No. 60/730,574 filed Oct. 26, 2005, entitled "APPARATUSES FOR COMMUNICATING WITHIN A WIRELESS NETWORK USING TWO FREQUENCY BANDS."

TECHNICAL FIELD

Embodiments of the present invention relate to the field of data communication, more specifically, to data communication in a wireless network.

BACKGROUND

In the current state of wireless communication, an increasing number of communication devices are able to wirelessly communicate with each other. These communication devices include a variety of devices having many different form factors varying from personal computers, mobile or desktop, displays, storage devices, hand-held devices, telephones, and so forth. A number of these communication devices are packaged as "purpose" devices, such as set-top boxes, personal digital assistants (PDAs), web tablets, pagers, text messengers, game devices, smart appliances, and wireless mobile phones. Such devices may communicate with each other in various different wireless environments such as wireless wide area networks (WWANs), wireless metropolitan area networks (WMANs), wireless local area networks (WLANs), and wireless personal area networks (WPANs), Global System for Mobile Communications (GSM) networks, code division multiple access (CDMA), and so forth.

The growing demand for high throughput applications such as video streaming, real-time collaboration, video content download, and the like, imposes stringent requirements on wireless communications to provide better, faster, and lower cost communications systems. In recent years, unlicensed frequency bands such as 2.4 GHz (Industrial, Scientific, Medical (ISM)) and 5.0 GHz (Universal National Information Infrastructure (UNII)) bands have been utilized for communications up to few hundred Mbps. To achieve these bit rates, relatively complex modulation techniques such as multiple-input/multiple-output (MIMO) orthogonal frequency division multiplexing (OFDM) have been proposed to the Institute of Electrical and Electronics Engineers (IEEE). Due to the popularity of the ISM and UNII bands, these bands are becoming crowded resulting in substantial interference for users of these bands.

To provide an interference limited Gbps communications, IEEE committees have recently begun looking at communications at higher frequencies such as frequency bands greater than 20 GHz. FIG. 1 shows the currently available unlicensed frequency bands in selected major industrialized countries/regions.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF ILLUSTRATIVE EMBODIMENTS OF THE INVENTION

Figure 1:
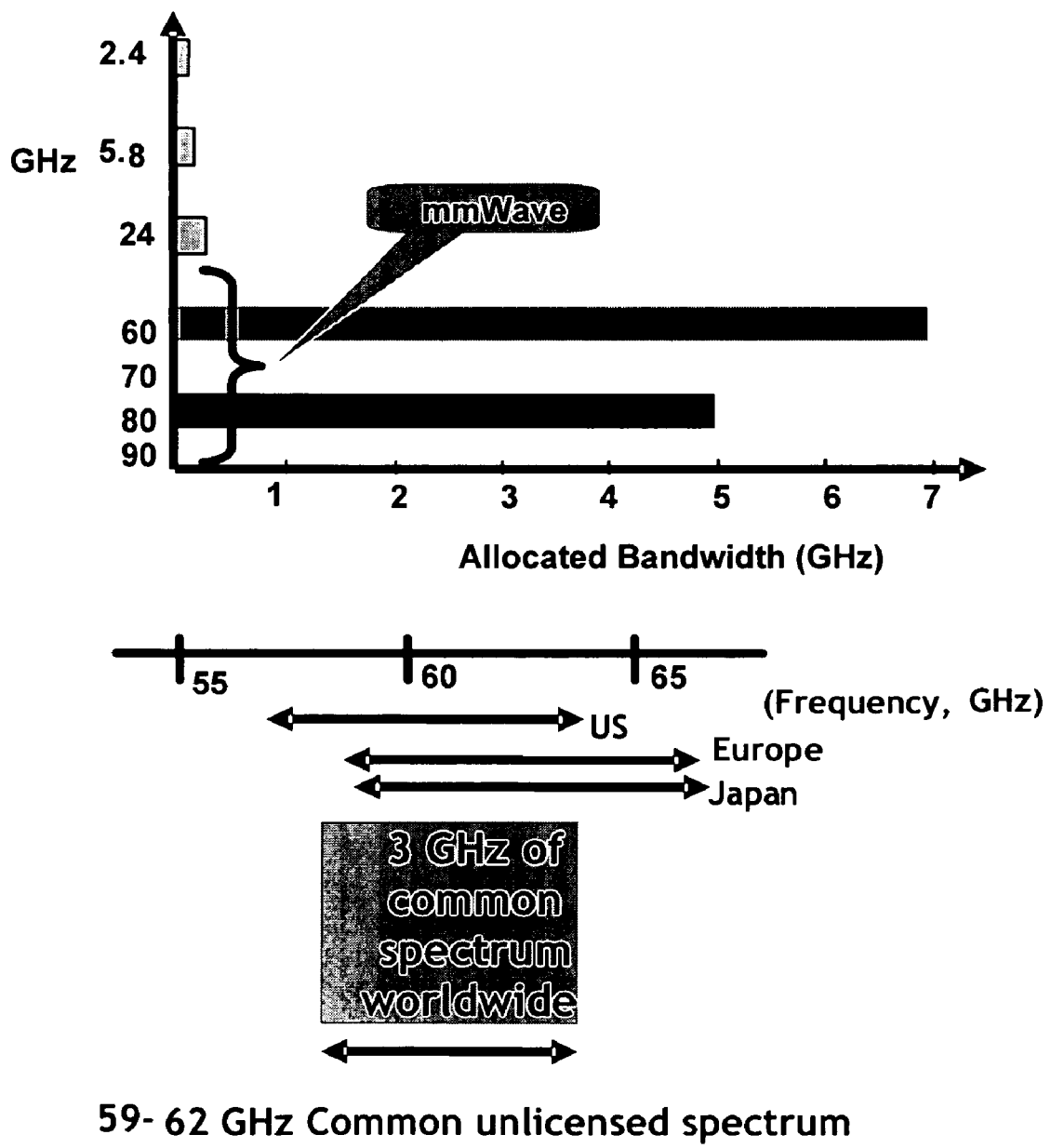
FIG. 1 illustrates currently available unlicensed frequency bands in selected major industrialized countries/regions.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use phrases such as "in one embodiment," or "in various embodiments," which may each refer to one or more of the same or different embodiments. Furthermore, the terms "comprising," "including," "having," and the like, as used with respect to embodiments of the present invention, are synonymous.

According to various embodiments of the invention, systems are provided that allows a communication device to communicate with other communication devices in a wireless network using a first and a second frequency band. For the embodiments, the first frequency band may be associated with a first beamwidth while the second frequency band may be associated with a second beamwidth, the first beamwidth being greater than the second beamwidth. In various embodiments, the first frequency band may be a lower frequency band than the second frequency band. Although the following description describes using two frequency bands, in alternative embodiments, more than two frequency bands may be employed.

The first frequency band may be employed to communicate (i.e., transmit and/or receive) first signals to facilitate initial communication between the communication device and the other communication devices of the wireless network, including initial communication of first signals containing signals and/or control information for coarse configuration of the other communication devices to wirelessly communicate with the communication device. The subsequent communication of second signals between the devices may be transmitted using the second frequency band. The second signals, in some embodiments, may include signals and/or control information for finer configuration of the other communication devices to wirelessly communicate with the communication device.

In some embodiments, the first signals may be adapted for signal detection, initial beam forming, and/or initial carrier frequency offset (CFO) estimation, to facilitate subsequent communication using the second frequency band. The second signals communicated through the second frequency band may be adapted for more precise beam forming that supplements the initial beam forming and/or signals that are adapted for fine CFO estimation that may supplement the initial CFO estimation. The second signals may further facilitate timing synchronization of the other communication devices to the communication device. The second signals communicated using the second frequency band, as previously alluded to, may facilitate further communication using the second frequency band in order to facilitate the communication of third signals using the second frequency band. The third signals to be communicated using the second frequency band may include various types of data including, for example, data relating to video streaming, realtime and/or non-realtime collaboration, video content download, audio and text content download and/or upload, and so forth.

Various approaches may be used in various alternative embodiments in order to communicate via the first frequency band associated with the first beamwidth (herein "first frequency band") and the second frequency band associated with the second beamwidth (herein "second frequency band"). For example, in some embodiments, communication using the first frequency band may be as a result of using a relatively low frequency band such as those bands less than about 20 GHz while communication using the second frequency band may be as a result of using a higher frequency band such as those bands centered above about 20 GHz. Various antenna systems that may include various combinations of antennas and/or multi-element antennas may be employed in various alternative embodiments in order to communicate using the first and the second frequency bands.

The first frequency band may be a lower frequency band than the second frequency band. For these embodiments, the first frequency band may be the 2.4 GHz ISM band or the 5.0 GHz UNII band, or some other band less than about 20 GHz while the second frequency band may be a higher frequency band such as a band greater than about 20 GHz, including for example, the 24 GHz band or a band centered in the 59 to 62 GHz spectra. Note that for purposes of this description, the process of communicating using the first lower frequency band may be referred to as out-of-band (OOB) communications and the process of communicating using the second higher frequency band may be referred to as in-band communications. Note further that other frequency bands may also be used as the first and second frequency bands in alternative embodiments and that the demarcation between the first lower frequency band and the second higher frequency band may not be at 20 GHz.

The first frequency band may be used by the communication device to communicate with the other communication devices of the wireless network, OOB control information signals or simply "first control signals" to facilitate data communication using the second frequency band. The first control signals may comprise of "signals" and/or "control information" to facilitate initial or coarse beamforming, carrier frequency offset (CFO) estimation, timing synchronization, and so forth, of the device or the other communication devices. In some embodiments, the communication device may use the second frequency band to transmit and/or receive to and/or from the other communication devices of the wireless network, in-band control information signals or simply "second control signals" to further facilitate data communication using the second frequency band. The second control signals may be comprised of signals and control information to facilitate fine beamforming, CFO estimation, timing synchronization, and so forth, of the communication device or the other communication devices. The subsequent data or data signals to be communicated (i.e., transmitted and/or received) using the second frequency band may include signals for tracking of the beamforming, CFO, timing, and so forth, as well as various types of data including, for example, data relating to video streaming, realtime and/or non-realtime collaboration, video content download, audio and text content download and/or upload, and so forth In order to appreciate various aspects of embodiments of the invention, the characteristics of a frequency band associated with a relative broad beamwidth and the characteristics of a frequency band associated with a relatively narrow beamwidth will now be discussed. This discussion will also describe the characteristics of various types of antennas including, for example, omnidirectional and directional antennas. In addition, a discussion relating to the impact of using a lower as opposed to a higher frequency band will also be provided.

This discussion begins with a brief description of beamwidths. A beamwidth is a spatial characteristic typically associated with antennas or dishes. The beamwidth of an antenna may be determined by the ratio of the antenna aperture size to the wavelength of the signals to be transmitted (or received). That is, the greater the aperture size, the narrower the beamwidth if the wavelengths of the signals to be transmitted (or received) are held constant. Alternatively, the beamwidth may also be made narrower by transmitting (or receiving) signals of shorter wavelengths (i.e., higher frequency) while maintaining a constant aperture size. Thus when an antenna or antennas having similar sized apertures transmit signals of different frequency bands, different beamwidths may result. Note that although the above discussion relates to, among other things, the relationship between aperture size and beamwidth, multi-element antennas may be employed to selectively control the beamwidth of the signals to be transmitted, in which case aperture size may not be relevant as to beamwidth of the signals to be transmitted. That is, antenna systems may be employed that have multi-element antennas that may be adaptively configured to selectively transmit (or receive) signals associated with different beamwidths.

Thus, in order to obtain a relatively broad beamwidth, one approach is to use an antenna having a small aperture, such as an omnidirectional antenna, instead of or in addition to using a relatively low frequency band (e.g., ISM or UNII bands). In contrast, in order to obtain a narrower beamwidth, one approach is to use an antenna having a large aperture, such as a directional antenna, instead of or in addition to using a relatively high frequency band. Of course, alternatively, a single antenna may provide varying beamwidths simply by varying the frequency bands (i.e., either higher or lower frequency bands) of the signals to be transmitted and/or received. In still other alternative approaches, and as previously alluded to, multi-element antennas may be employed to provide frequency bands with varying beamwidths. That is, a single set of multi-element antennas may be adaptively controlled using, for example, special procedures or protocols to provide specific beam directions and specific beam shapes. Thus, a single set of multi-element antennas may be employed to provide multiple frequency bands of varying beamwidths. Note that in the following description, the phrase "antenna" may refer to a single antenna or multi-element antennas.

Figure 2:
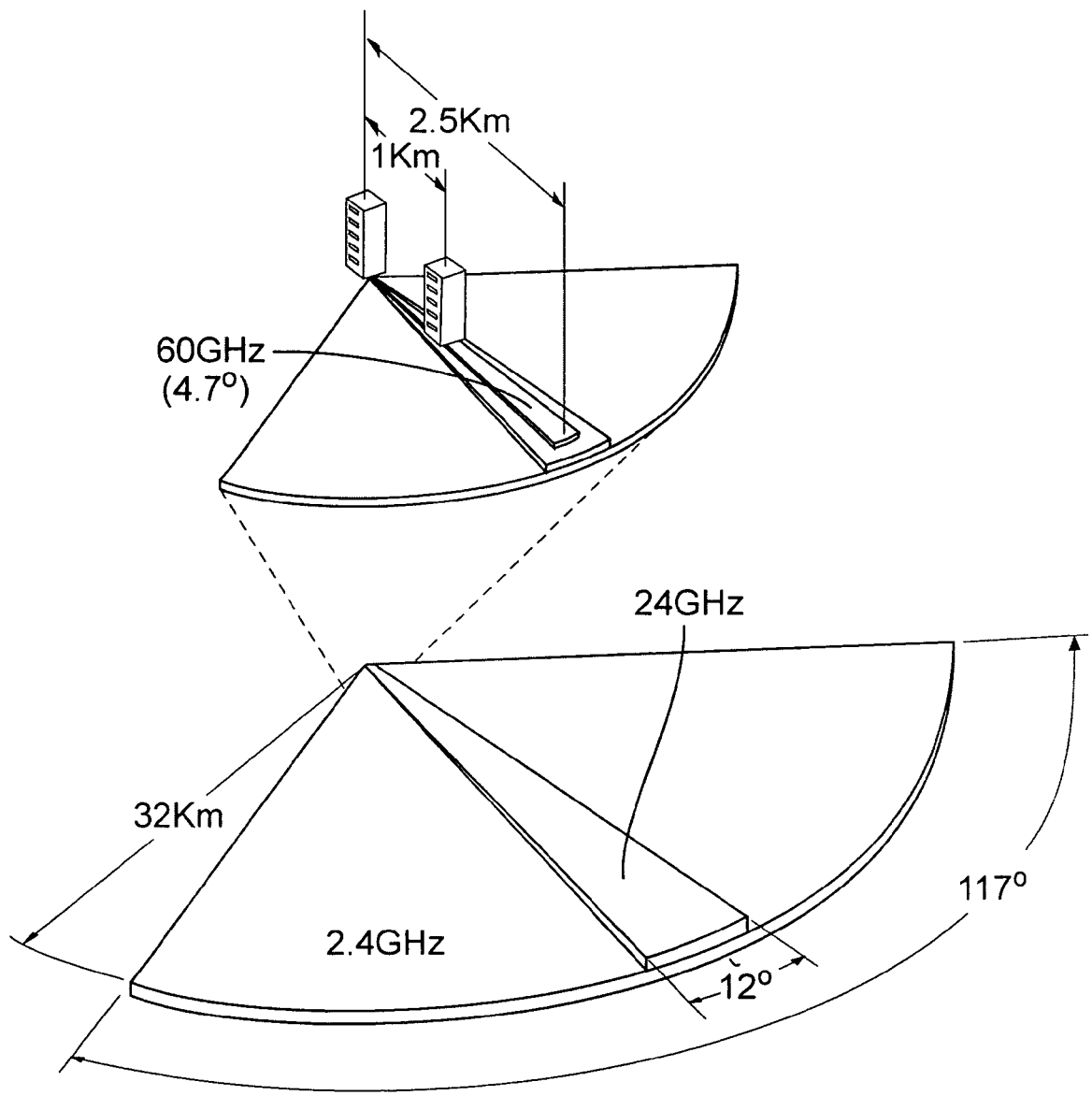
FIG. 2 illustrates exemplary beamwidths of different frequency bands using antennae with about the same aperture size.

Referring now to FIG. 2 comparing the beamwidths of various frequency bands using antennas with about the same aperture size. As previously alluded to, one of the properties of using a lower frequency band such as the 2.4 GHz (ISM) band or the 5.0 GHz (UNII) band instead of a higher frequency band such as an in-band frequency band (e.g., bands greater than 20 GHz) for communicating in a, for example, wireless network is that the lower frequency bands may be associated with a greater beamwidth. Because of the greater beamwidth, signals transmitted via the lower frequency bands will likely reach more devices in the wireless network. However, because of the greater beamwidth, the drawback in using a lower frequency band is that because of the broader wedge, there is a greater risk of interference and interception.

In contrast to the lower frequency bands, when higher frequency bands are used for communicating in a wireless network a narrower beamwidth may result as previously described. As a result, there may be less likelihood of interference. In addition to the narrower beamwidth, another property of a higher frequency band is that if a higher frequency band (such as the 24 or the 60 GHz band) is used then there may be an additional attenuation with distance due to, for example, oxygen absorption. That is, and as depicted in FIG. 2, a higher frequency band (e.g., 60 GHz band) may have a smaller beamwidth and a shorter "range" or "reach" than a lower frequency band (e.g., 2.4 or 5.0 GHz bands). Thus, devices operating in the 60 GHz band instead of a lower band such as the 2.4 or 5.0 GHz bands may typically have less interference risk from other remote devices.

Another characteristic of using a higher frequency band for communicating in a wireless network is that the higher frequency band may allow higher signal bandwidth to be used (as more spectra is typically available at higher frequencies) which may consequently allow greater data throughput. At the same time, using the larger bandwidth may decrease the power spectral density of the transmit signal and potentially decrease the reliable communication range due to less signal-to-noise ratio at the receiver side.

The use of higher frequency bands for communicating in a wireless network may mean that a directional antenna rather than an omnidirectional antenna may be used for such communication. The use of such an antenna by itself may offer certain advantages and disadvantages when used to communicate in a wireless network. For example, one advantage of using a directional antenna and the higher frequency band for transmitting signals is that less power may be needed in comparison to using an omnidirectional antenna to achieve the same level of received power. Thus, less efficient (and less expensive) radio frequency (RF) components may be used with the directional antenna, which may be a significant factor in some situations as costs of RF parts may be significantly higher for higher frequency communication.

Of course, there may be certain drawbacks when communicating in a wireless network using a higher frequency band with a directional antenna. For example, adapted or multiple fixed antenna setting that spans 360 degrees may be needed in order to register all of the communication devices in the network. This may be very time-consuming and synchronizing the communication device in the network using, for example, protocols such as carrier sense multiple access and collision avoidance (CSMA/CA) or carrier sense multiple access and collision detection (CSMA/CD) may be very difficult and may not be feasible when a higher frequency band using a directional antenna is employed.

The characteristics of frequency bands associated with different beamwidths as described above may be combined and used in a wireless communication network in accordance with various embodiments of the invention as described below.

Figure 3:
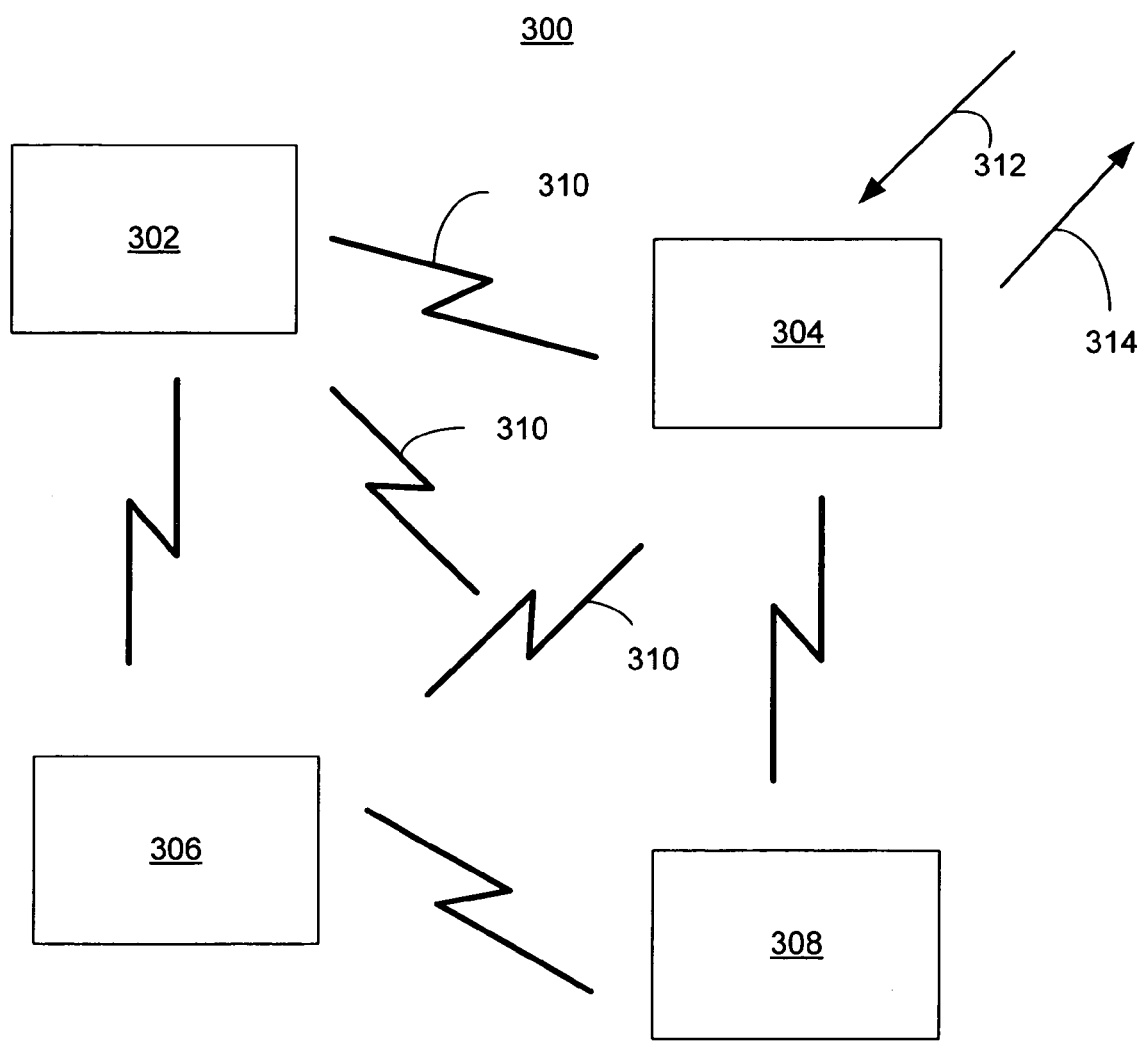
FIG. 3 illustrates a wireless network in accordance with various embodiments of the present invention.

FIG. 3 illustrates a wireless network that includes multiple communication devices (CDs) that are in communication with each other via multiple communication links in accordance with various embodiments. For the embodiments, the network 300 may be WWAN, WMAN, WLAN, WPAN, or other types of wireless networks. The communication devices (CDs) 302-308 may be desktop computers, laptop computers, set-top boxes, personal digital assistants (PDAs), web tablets, pagers, text messengers, game devices, smart appliances, wireless mobile phones or any other types of computing or communication devices. In some embodiments, at least one of the CDs 302-308 may be a master or an access point, while the other CDs may be the client or slave devices. Note that in alternative embodiments, the network 300 may include more or fewer CDs. Each of the CDs 302-308 may communicate with the other CDs of the network 300 via links 310 that may be bidirectional. Communication between the CDs 302-308 may be in accordance with standards such as 802.11a, 802.11b, and other derivatives of these standards.

For ease of understanding, embodiments of the present invention will be further described assuming that the network 300 is a WPAN and that CD 302 is the access point and that the other CDs 304-308 are the client devices. Note that in alternative embodiments, the network 300 may not include an access point. For example, the network 300 may be an ad-hoc mesh network in alternative embodiments, in which case, the access point is not needed. Returning to FIG. 3, in some embodiments, at least some of the client CDs 304-308 may arbitrarily and randomly join and/or leave the network 300. Each time a client CD 304-308 enters the network 300, it may authenticate or associate (herein "associate") with the network 300 so that the various client CDs of the network 300 may "know" that the client CD is present in the network 300. In some embodiments, a client CD 304-308 may associate with the network 300 by associating with the access point CD 302. Note that in this illustration, client CD 304 has just entered the network 300 as indicated by reference 312.

The CD 304 upon entering the network 300 may associate itself with the network (e.g., via access point CD 302). In accordance with various embodiments, association with the network 300 may be accomplished using, for example, a first frequency band associated with a relatively broad beamwidth. By transmitting the association signals using a frequency band associated with a relatively broad beamwidth (herein "first beamwidth"), the other CDs 302, 306, and 308 in the network 300 may be more likely to receive the authentication signals (e.g., beacons) from CD 304. In some embodiments, the first frequency band may be a 2.4 GHz (ISM), a 5.0 GHz (UNII), or other bands that may be less than, for example, 20 GHz. Note that the access point CD 302 may listen for (i.e., authentication or association) an entering CD 304 through signals transmitted in the first frequency band. After successfully registering or associating with the network 300 (which may be effectuated via any one of a number of association and/or authentication protocols), the components of CD 304 may then "sleep" until it receives data transmission from one of the other CDs in the network or is ready to transmit data to the network 300 (i.e., to one or more of the other CDs in the network 300).

When the client CD 304 is ready to transmit signals to one or more of the other CDs in the network 300 (including the access point CD 302), it may initially transmit first control signals that include control information using again the first frequency band associated with the first beamwidth. In using the first frequency band associated with the first beamwidth, the other CDs 302, 306, and 308 in the network 300 are more likely to "hear" or receive the signals transmitted by the client CD 304. This may provide the opportunity to reduce the interference in the second frequency band because the devices are now aware of intentions of the CD 304 and may therefore defer their transmission for the appropriate time period. In various embodiments, the other CDs 302, 306, and 308 may determine the signal parameters of the first control signals transmitted by the client CD 304. By measuring the signal parameters, the other CDs 302, 306, and 308 may determine the signal strength and the angle of arrival of the first control signals. As a result, the other CDs 302, 306, and 308 may be facilitated in determining the distance between the other CDs 302, 306, and 308, and the client CD 304.

Further, the location, at least in part, of CD 304 relative to the other CDs (i.e., in terms of azimuth and elevation) may be determined by the other CDs 302, 306, and 308 based at least in part on the angle of arrival of the initial signals using the first frequency band. These determinations, in effect, may facilitate further communication using a second frequency band associated with a relatively narrow beamwidth. That is, the antenna systems employed by the other CDs 302, 306, and 308 may be properly configured and/or aligned based on the determinations to facilitate further communication using the second frequency band between the CDs 302, 306, and 308, and the client CD 304.

The first control signals transmitted through the first frequency band may facilitate initial communication between the CD 304 and the other CDs 302, 306, and 308 of the network 300, including signals and/or control information for coarse configuration by the other CDs 302, 306, and 308 to communicate with CD 304. The devices subsequently communicate using a second frequency band that is associated with a second beamwidth that may be a narrower beamwidth than the first beamwidth of the first frequency band. In some embodiments, the first control signals may include signals for medium access control (MAC) mechanism data such as data associated with CSMA/CA or CSMA/CD. Again, by using the first frequency band associated with the relatively broad beamwidth for communicating data, such as MAC mechanism data, each of the other CDs 302, 306, and 308 are more likely to receive the MAC mechanism data. The first control signals may further include signals as well s control information for initial beam forming parameters such as beam forming coefficients, synchronization parameters, initial CFO estimation, detection, and so forth. In particular, in some embodiments, the first control signals may be adapted to facilitate beam forming, CFO estimation, and/or synchronization of the other CDs 302, 306, and 308.

In some embodiments, where one or more of the CDs 302-304 employ antenna systems that include multi-element antennas, the first control signals transmitted using the first frequency band may include signals that facilitate different diversity techniques (e.g., antenna selection and maximum ratio combining), space-time codes (e.g., Alamouti code), and MIMO techniques.

The second frequency band may be a higher frequency band than the first frequency band. For example, the second frequency band may be an in-band band (i.e., greater than 20 GHz) such as the 24 GHz band or a frequency band in the 59-62 GHz spectra. The higher frequency bands such as those greater than 20 GHz may provide greater bandwidth than lower frequency bands (e.g., 2.4 GHz and 5.0 GHz). In various embodiments, communication using the second frequency band may be in accordance with a particular technique such as OFDM or other modulation techniques. Note that in some alternative embodiments, the first and the second frequency bands may be substantially the same frequency bands but may be associated with different beamwidth by using, for example, antennas of different aperture sizes or using an antenna system that employs multi-element antennas. Further note that if CD 304 is unable to communicate using the second frequency band, then CD 304 may operate in a fall-back operation mode in which communication is entirely via first frequency band at least until the second frequency band is made available. Such a fall-back mode may be needed, for instance, if the transmitting and receiving devices cannot "see" each other using the second frequency band.

After the first control signal has been transmitted using the first frequency band to facilitate communication, second control signals may be transmitted using the second frequency band to further establish communication. The second control signals may include signals and/or control information to facilitate fine beam forming, fine CFO estimation, synchronization, and so forth by the other CDs 302, 306, and 308. In some embodiments, the first and the second control signals may include beam forming, CFO estimation, and/or synchronization information as disclosed in co-pending application Ser. No. 11/394,572, entitled "Communication Within A Wireless Network Using Multiple Frequency Bands," contemporaneously filed. Once further communication using the second frequency band has been established, signals tracking of beamforming, CFO, timing, and so forth, as well as signals that include data such as video streaming, real-time collaboration, video content download, and the like may be communicated using the second frequency band.

When client CD 304 is to leave the network 300 as indicated by reference 314, the client CD 304 may exchange various exit information or parameters with the network 300 (e.g., access point CD 302) prior to exiting the network 300. Upon exiting the network 300, CD 304 may transmit exit information through the first frequency band. The exit information may include the reason code such as bad signal quality, or just does not want to communicate any more (the application has closed), or was not authorized to enter the network, and so forth.

Figure 4:
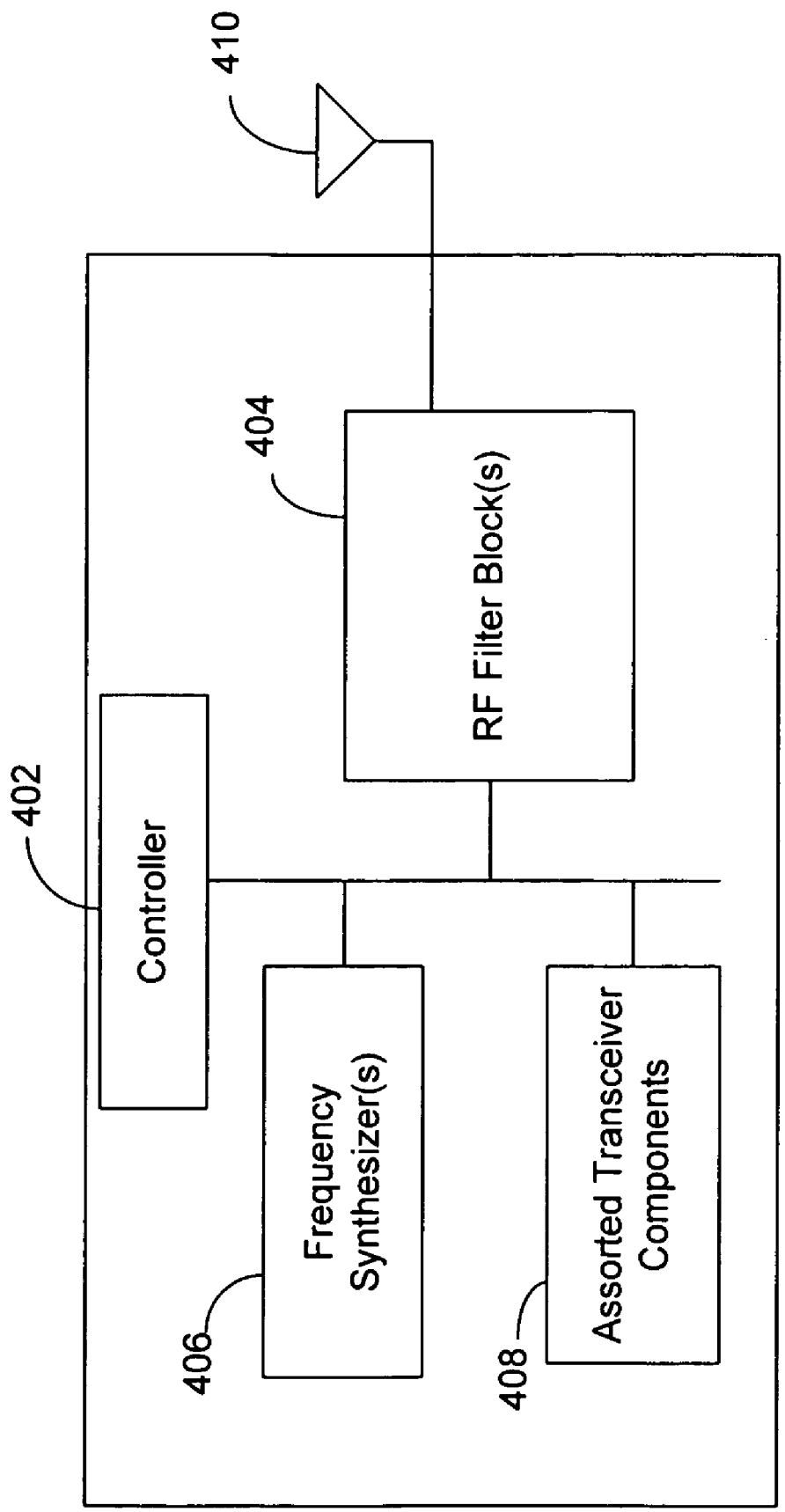
FIG. 4 illustrates a communication system for communicating in a wireless network using two frequency bands in accordance with various embodiments of the present invention.

FIG. 4 illustrates a communication system for communicating in a wireless network using a first and a second frequency band, wherein the first frequency band being associated with a first beamwidth that is broader than a second beamwidth associated with the second frequency band, in accordance with various embodiments. For the embodiments, the first frequency band being a lower frequency band than the second frequency band. The system 400 includes a controller 402, one or more radio frequency (RF) filter block(s) 404, one or more frequency synthesizer(s) 406, assorted transceiver components 408, and one or more antennas 410, coupled to each other as shown. The system 400 may transmit or receive control signals, and/or data signal through the first or the second frequency band as will be described in greater detail below.

The controller 402 may control the various system components (e.g., the one or more RF filter blocks 404, the one or more frequency synthesizers 406, and so forth) of the system 400 in order to transmit and/or receive signals using the first and the second frequency bands. In particular, the controller 402 may control the RF filter block(s) 404 to select the first frequency band to transmit or receive a first control signal to facilitate initial communication by the system (with other devices) in the wireless network, enabling subsequent communication by the system (with other devices) using the second frequency band. In some embodiments, the controller 402 may also control the frequency synthesizer(s) 406 to selectively generate at least a first and a second carrier signal to facilitate the transmission and reception of signals using the first and the second frequency bands, respectively.

In addition to the control signals transmitted through the first frequency band, the controller 402 may control the RF filter block(s) 404 and the frequency synthesizer(s) 406 to select the second frequency band to further transmit or receive additional control signal(s) to further enable or facilitate subsequent communication by the system (with other devices in the wireless network) using the second frequency band. Once communication using the second frequency band has been established, the controller 402 may control the RF filter block(s) 404 and the frequency synthesizer(s) 406 to select the second frequency band to transmit or receive data signals (to and from the other devices) in the wireless network. The controller 402 may be endowed with logic or may be coupled to a physical storage medium adapted to store instructions that enables the controller 402 to perform the various controller functions described herein. In some embodiments, the controller 402 may be a processor or a microcontroller.

The RF filter block(s) 404 may include various components including one or more RF filters, one or more switches, and one or more mixers. Such components and their functions will be described in greater detail below.

The frequency synthesizer(s) 406 may provide two or more carrier signals having two or more frequencies in order to facilitate communication using the first and the second frequency bands in accordance with various embodiments. The two or more carrier signals may be used to modulate or demodulate signals to be transmitted or received through the RF filter block(s) 404. In some embodiments, the frequency synthesizer(s) 406 may provide a first and a second carrier signal, the first carrier signal to facilitate communication using the first frequency band and the second carrier signal to facilitate communication using the second frequency band. The first carrier signal may be within the first frequency band and the second carrier signal may be within the second frequency band. In some embodiments, the first carrier signal may have a frequency that is less than about 20 GHz while the second carrier signal may have a frequency that is greater than about 20 GHz. In alternative or the same embodiments, the frequency synthesizer(s) 406 may provide a third frequency to further modulate or demodulate the signals to be transmitted or received through the RF filter block(s) 404. The frequency synthesizer(s) 406, in some instances, may be a multiple frequency synthesizer.

The assorted transceiver components 408 may include various components that may further facilitate communication using the first and the second frequency bands. These components may include, for example, digital-to-analog converters (DACs), analog-to-digital converters (ADC), switches, 90 degree phase splitters, adders, mixers, filters, amplifiers, and so forth.

The one or more antennas 410 may include one or more individual antennas and/or one or more multi-element antennas. Various types of antennas and/or multi-element antennas may be employed in various alternative embodiments of the present invention. Antennas that may be employed include, for example, omnidirectional and directional antennas, dipole antennas, and so forth.

Figure 5:
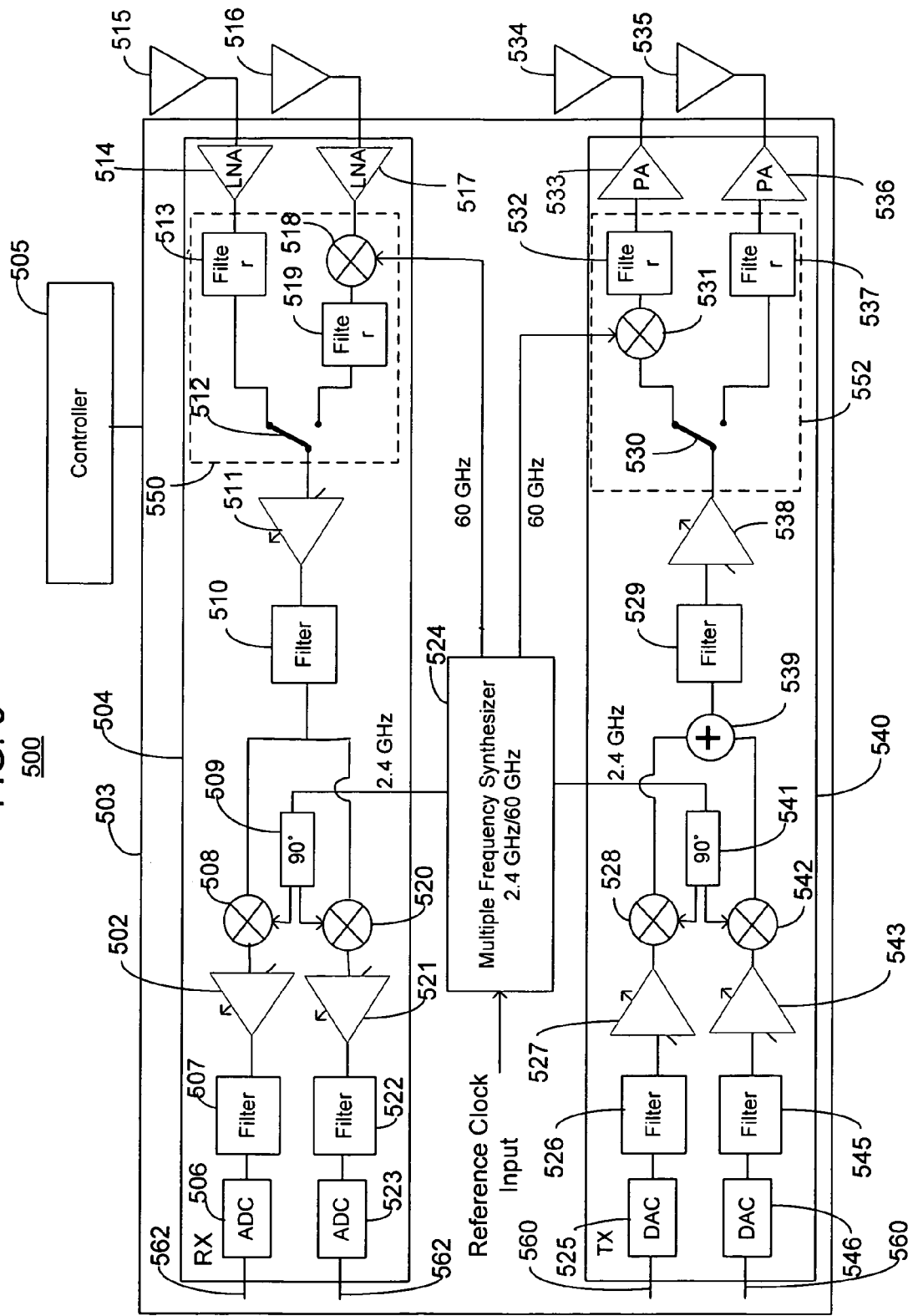
FIG. 5 illustrates a first variation of the system 400 of FIG. 4 in accordance with various embodiments of the present invention.

FIG. 5 illustrates a first variation of the system 400 of FIG. 4 in accordance with various embodiments. For the embodiments, the system 500 is adapted to transmit and/or receive signals using a first frequency band (e.g., 2.4 GHz frequency band) and a second frequency band (e.g., 62.4 GHz frequency band). For purposes of this description, the system 500 may be referred to as a zero intermediate frequency (ZIF) system. The system 500 includes a controller 505, a transceiver circuitry 503, and antennas 515, 516, 534, and 535, coupled to each other as shown. The transceiver circuitry 503 further comprising a receiver circuitry 504, a transmitter circuitry 540, and a multiple frequency synthesizer 524. As depicted, the multiple frequency synthesizer 524 is a 2.4/60 GHz frequency synthesizer. Note that in alternative embodiments, the multiple frequency synthesizer 524 may be replaced by two or more frequency synthesizers. Similarly, the antennas 515, 516, 534, and 535 may be replaced with fewer or more antennas than depicted. In some embodiments, one or more of the antennas 515, 516, 534, and 535 may be multi-element antennas.

As illustrated, the transmitter circuitry 540 includes a pair of inputs 560 while the receiver circuitry 504 includes a pair of outputs 562. In some embodiments, the two inputs may be adapted for receiving in-phase and quadrature signals. Similarly, the outputs may be adapted for outputting in-phase and quadrature signals. The signals to be received or outputted through the inputs 560 and outputs 562 may be in accordance with OFDM or some other modulation technique. The following discussion will begin with a somewhat detailed discussion of the transmission portion (i.e., transmitter circuitry 540) of the system 500 followed by a brief discussion of the receiver portion of the system since the reception portion (i.e., receiver circuitry 504) of the system will have, with a few exceptions to be described below, similar corresponding components as the transmission portion of the transceiver circuitry 503 performing similar functions except that the components of the reception portion will be oriented in the opposite direction to accommodate for reception signals rather than transmission signals.

The transmitter circuitry 540, may receive two input signals through the two inputs 560, the two input signals being digital signals. The two input signals are then converted into analog signals by DACs 525 and 546, which are then outputted and pass filtered through filters 526 and 545, and amplified through variable amplifiers 527 and 543. In some embodiments, the filters 526 and 545 may be low-pass filters. Note that for purposes of this description, the filter 526 and the variable amplifier 527 pair and the filter 545 and the variable amplifier 543 pair may each be referred to as a filter-and-amplifier pair. Further note that in some embodiments, the filters 526 and 545 may be bandpass filters. The two signals that are outputted by the variable amplifiers 527 and 543 are then modulated with two 2.4 GHz carrier signals provided by the 90 degrees phase splitter 541 using mixers 528 and 542. The two 2.4 GHz modulating signals provided to the mixers 528 and 542 are 90 degrees out-of-phase with each other. This is accomplished by using the 90 degrees phase splitter 541 based on a single 2.4 GHz carrier signal provided by the multiple frequency synthesizer 524.

The two resulting modulated signals outputted by the mixers 528 and 542 as a result will be 90 degrees out-of-phase with each other. The two resulting signals will then be combined using adder 539, and the resulting combined signals will be passed through filter 529 and to the variable amplifier 538. The resulting amplified signal is then provided to switch 530, which may route the amplified signal to either mixer 531 and RF filter 532, or RF filter 537 by coupling to either mixer 531 and RF filter 532, or RF filter 537. RF filter 537 may be a lower band RF filter adapted to band-pass filter signals to be transmitted through the first frequency band, in this case, the 2.4 GHz frequency band. The mixer 531 modulates signals received through the switch 530 with a 60 GHz carrier signal provided by the multiple frequency synthesizer 524. Thus, the multiple frequency synthesizer 524 provides a higher frequency carrier signal (i.e., 60 GHz) to the mixer 531 than to mixers 528 and 542 (i.e., 2.4 GHz carrier signal). The signals outputted by the mixer 531 is provided to the RF filter 532, which may be a higher band RF filter adapted to pass filter, such as band-pass filter, signals to be transmitted through the second frequency band, in this case, the 62.4 GHz frequency band. The signals outputted by RF filters 532 or 537 are then outputted to the power amplifiers 533 and 536 and transmitted wirelessly through antennas 534 and 535. Note again that the receiver circuitry 504 has similar corresponding components as the transmitter circuitry 540 as described above. For example, the receiver circuitry 504 includes a corresponding lower band RF filter 513 and a higher band RF filter 519 for pass filtering, such as band-pass filtering, signals received through the first and the second frequency band.

The controller 505, in various embodiments, is coupled to switch 530 (as well as switch 512 of receiver circuitry 504) to adaptively control the switch 530 in order to transmit signals through the first or the second frequency band. In various embodiments, the switch 530 may either couple to mixer 531 and filter 532, or to RF filter 537, depending upon whether, for example, a first control signal, a second control signal, or a data signal is being transmitted. For instance, when a first control signal is received through one or both of the inputs 560, the controller 505 controls the switch 530 to couple with the RF filter 537 resulting in the first control signal being transmitted via the first frequency band (e.g., 2.4 GHz band). If, on the other hand, a second control signal or a data signal is received through one or both of the inputs 560, then the controller 505 controls the switch 530 to couple with the mixer 531 and RF filter 532 resulting in the second control signal or data signal being transmitted via the second frequency band (e.g., 60 GHz band).

Similarly, the controller 505, which is coupled to switch 512 of the receiver circuitry 504, may be adapted to control the switch 512 in order to receive signals received through the first or the second frequency band. The switch 512 may either couple to RF filter 519 and mixer 518, or to RF filter 513, depending upon whether a first control signal, a second control signal, or a data signal is being received. For example, when a first control signal is received by the system 500 using the first frequency band (i.e., 2.4 GHz frequency band), the first control signal may be received through antenna 515. The controller 505 controls the switch 512 to couple with the lower band RF filter 513 resulting in the first control signal received through antenna 515 being passed through the lower band RF filter 513 and onto the rest of the receiver circuitry 504. If, on the other hand, a second control signal or a data signal is received by the system 500 using the second frequency band (i.e., 62.4 GHz frequency band), then the second control signal or the data signal may be received through antenna 516. The controller 505 controls the switch 530 to couple with the higher band RF filter 519 and mixer 518 resulting in the second control signal or the data signal being passed through the mixer 518, which demodulates the second control signal or the data signal with the 60 GHz carrier signal, and through the higher band RF filter 519 and onto the rest of the receiver circuitry 504.

The reception signals (e.g., first control signal, second control signal, and/or data signal) received through the switch 512 are then routed through variable amplifier 511 and filter 510, and then to mixers 508 and 520, which demodulate the reception signals with two 2.4 GHz carrier signals that are 90 degrees out-of-phase with each other supplied by a 90 degrees phase splitter 509. The two demodulated signals that are outputted by the mixers 508 and 520 are then outputted through amplifiers 502 and 521, filters 507 and 522, ADCs 506 and 523, and through outputs 562.

Although the transmitter circuitry 540 and the receiver circuitry 504 generally mirror each having similar components performing similar functions, there are some differences between the receiver circuitry 504 and the transmitter circuitry 540. For example, instead of DACs 525 and 546 as in the transmitter circuitry 540, the receiver circuitry 504 includes ADCs 506 and 523 converting analog signals received from the filters 507 and 522 and outputting the resulting digital signals to the outputs 562. Also, unlike the transmitter circuitry 540, the receiver circuitry 504 does not include an adder 539. Further, the amplifiers 514 and 517 of the receiver circuitry 504 that corresponds to the power amplifiers 533 and 536 of the transmitter circuitry 540 are low noise amplifiers. Finally, mixers 508 and 520 of the receiver circuitry 504 will demodulate reception signals rather than modulate signals as in the case of the mixers 528 and 542 of the transmitter circuitry 540. Likewise mixer 518 of the receiver circuitry 504 demodulates signals rather than modulate signals as is the case for its corresponding mixer 531 in the transmitter circuitry 540.

In various embodiments, the switch 530, mixer 531, and filters 532 and 537 comprises an RF filter block 552. The RF filter block 552 is a dedicated transmitter RF filter block for transmitting signals in a wireless network using the first and the second frequency band. Similarly, the receiver circuitry 504 includes another RF filter block 550 similarly constituted comprising a switch 512, mixer 518, and filters 513 and 519. The RF filter block 550 for the receiver circuitry 504 is a dedicated receiver RF filter block for receiving signals in a wireless network using the first and the second frequency band. Thus, the two RF filter blocks 552 and 550 generally represents the RF filter block(s) 404 of FIG. 4.

Figure 6:
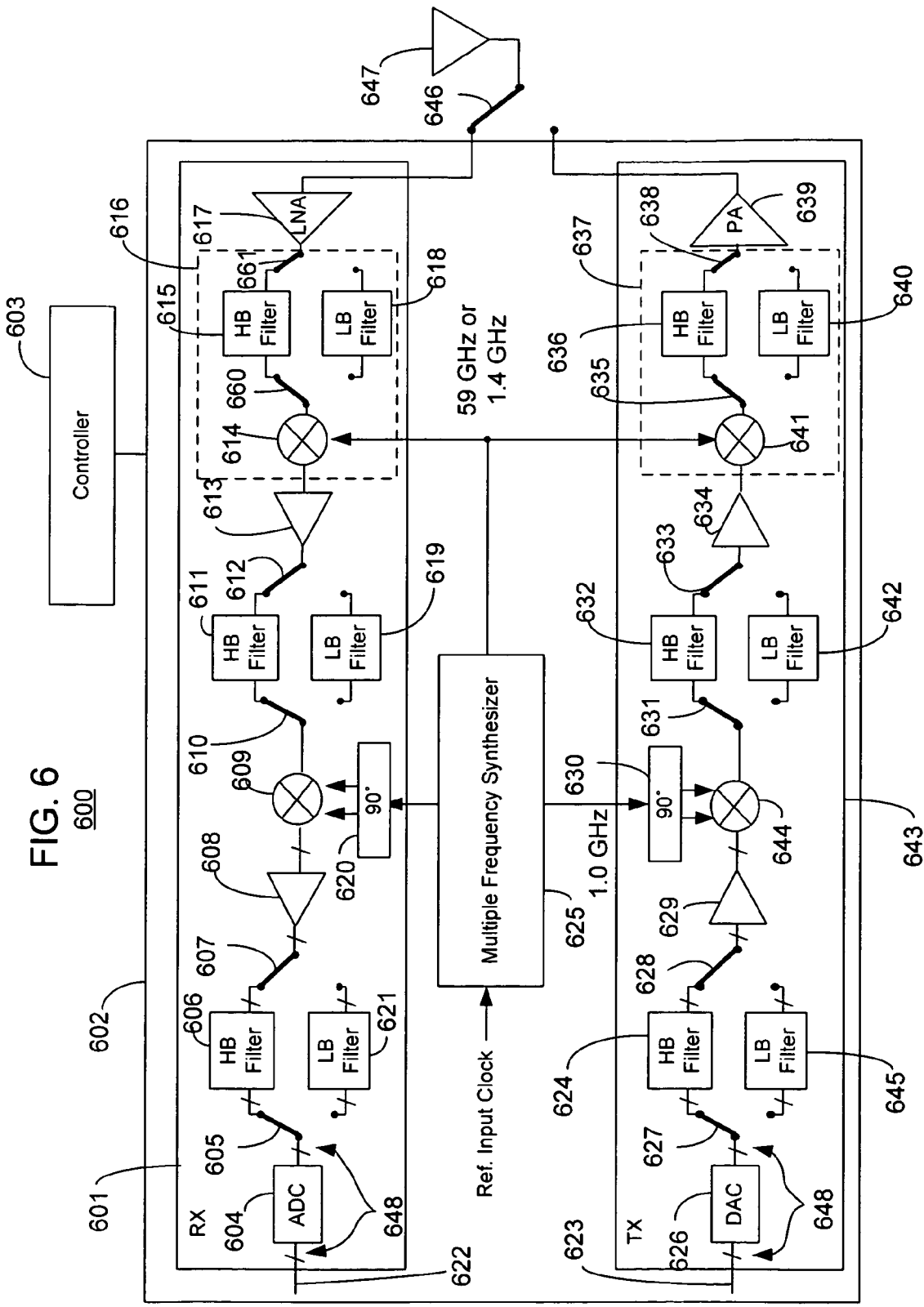
FIG. 6 illustrates a second variation of the system 400 of FIG. 4 in accordance with various embodiments of the present invention.

Referring now to FIG. 6 illustrating a second variation of the system 400 of FIG. 4 in accordance with various embodiments. For the embodiments, the system 600 is adapted to transmit and/or receive signals in a wireless network using a first frequency band (e.g., 2.4 GHz frequency band) and a second frequency band (e.g., 60 GHz frequency band). For purposes of this description, the system 600 may be referred to as a superheterodyne system. Similar to the system 500 of FIG. 5, the system 600 includes a controller 603, a transceiver circuitry 602, and an antenna 647, coupled to each as shown. The transceiver circuitry 602 further comprises a receiver circuitry 601, a transmitter circuitry 643, and a multiple frequency synthesizer 625. Note that in alternative embodiments, the multiple frequency synthesizer 625 may be replaced with a plurality of frequency synthesizers. Note further that although only one antenna 647 is depicted, in alternative embodiments, multiple antennas or a plurality of multi-element antennas may be employed. Also, as depicted, each of the connection lines with dashes (see, for example, reference 648) indicates a bus comprising at least two lines for carrying two signals concurrently.

For ease of understanding, the following discussion will generally be directed to the transmission portion (i.e., transmitter circuitry 643) of the system 600, followed by a very brief discussion of the reception portion (i.e., receiver circuitry 601) of the system 600. That is, the reception portion of the system 600 has similar components performing similar functions with certain notable exceptions (e.g., the mixers 609 and 614 of the receiver circuitry 601 will demodulate rather than modulate signals as is the case of the mixers 641 and 644 of the transmitter circuitry 643). As in the case of the transmitter circuitry 540 of FIG. 5, the transmitter circuitry 643 has an input 623 for receiving a first and a second input signals. In some embodiments, the first input signal may be an in-phase signal while the second input signal may be a quadrature signal. The first and the second input signals may be in accordance with OFDM or some other modulation technique. The transmitter circuitry 643 further includes a number of switches 627, 628, 631, 633, 635, and 638, higher band RF filters 624, 632, and 636, lower band filters 645, 642, and 640, amplifiers 629, 634, and 639, mixers 644 and 641, and a 90 degree phase splitter 630, coupled to each other as shown. Each of the switches 627, 628, 631, 633, 635, and 638 of the transmitter circuitry as well as switch 646 are coupled to the controller 603. The controller 603 may control the switches 627, 628, 631, 633, 635, 638, and 646 to transmit signals (i.e., a first control signal, a second control signal, and data signals) using either the first or the second frequency band (e.g., 2.4 or 60 GHz frequency bands).

Similar to the transmitter circuitry 540 of FIG. 5, the transmitter circuitry 643 also includes an RF filter block 637 comprising a mixer 641, two switches 635 and 638, and higher and lower band RF filters 636 and 640, coupled with each other as shown. The lower band RF filter 640 is adapted to pass filter (e.g., band-pass filter) signals such as a first control signal to be transmitted via the first frequency band (e.g., 2.4 GHz band). The higher band RF filter 636 is adapted to pass filter (e.g., band-pass filter) signals, such as a second control signal or data signal, to be transmitted via the second frequency band (e.g., 60 GHz band). The controller 603 may control the switches 635 and 638 to selectively couple with either the lower band RF filter 640 or the higher band RF filter 636 depending on whether the first or the second frequency band is to be selected for transmission of signals. Note that the receiver circuitry 601 also includes an RF filter block 616 comprising similar components (i.e., mixer 614, switches 660 and 661, and higher and lower band RF filters 615 and 618). Thus the RF filter block 637 is dedicated for transmitting signals through the first and the second frequency band while RF filter block 616 is dedicated for receiving signals received through the first and the second frequency band.

Although the RF filter block 637 is similar to the RF filter block 552 of FIG. 5, there is at least one difference between the RF filter block 637 and the RF filter block 552 of FIG. 5—the location of the mixer 641. That is, unlike mixer 531 of FIG. 5, which is coupled to the filter 532, the mixer 641 in FIG. 6 is coupled directly to the switch 635 on the input side of the switch 635. The reason for this will be readily appreciated by those skilled in the art from the following discussion relating to the multiple frequency synthesizer 625.

The multiple frequency synthesizer 625, in various embodiments, may provide at least a first, a second, and a third carrier signal to the transmitter circuitry 643 (as well as to the receiver circuitry 601). For these embodiments, the first carrier signal has a frequency of 1.4 GHz, the second carrier signal has a frequency of 59 GHz, and the third carrier signal, which may be an intermediate frequency (IF) carrier signal, has a frequency of 1.0 GHz. Note that in alternative embodiments, one or more of the first, the second, and the third carrier signal may have alternative frequencies. For example, in some embodiments, the third carrier signal (e.g., IF carrier signal) provided by the multiple frequency synthesizer 625 may be, for example, a 5.4 GHz carrier signal and therefore, the first and the second carrier signal may be down converted to accommodate for the 5.4 GHz IF carrier signal. In such a case, the multiple frequency synthesizer 625 would provide a first carrier signal having a frequency of 54.6 GHz (i.e., 60 GHz minus 5.4 GHz) and a second carrier signal having a frequency of 3.0 GHz (i.e., absolute value of 2.4 GHz minus 5.4 GHz).

The first and second carrier signals are provided to the mixer 641 to modulate signals to be transmitted by the RF filter block 637. That is, the controller 603 controls the multiple frequency synthesizer 625 so that the multiple frequency synthesizer 625 provides a 1.4 GHz carrier signal to the mixer 641 when signals, such as first control signals, are to be transmitted using the first frequency band (e.g., 2.4 GHz band), and to provide a 59 GHz carrier signal to the mixer 641 in subsequent communications when signals, such as second control signals or data signals, are to be transmitted using the second frequency band (e.g., 60 GHz band). Similarly, on the receiver side, the controller 603 may control the multiple frequency synthesizer 625 to provide the 1.4 GHz carrier signal to the mixer 614 when signals, such as first control signals, are to be received using the first frequency band, and to provide a 59 GHz carrier signal to the mixer 614 in subsequent communications when signals, such as second control signals or data signals, are to be received using the second frequency band.

As previously described, the multiple frequency synthesizer 625 provides a third 1.0 GHz carrier signal. The third 1.0 GHz carrier signal is provided to the 90 degrees phase splitter 630 for modulation of signals to be transmitted by the transmitter circuitry 643 (or in the case of the receiver circuitry 601, provided to 90 degrees phase splitter 620 for demodulating signals received by the receiver circuitry 601). Because of the modulation of the signals to be transmitted by the transmitter circuitry 643, the first and second carrier signals need not be carrier signals having 2.4 and 60 GHz frequencies respectively to transmit using the first and second frequency bands (e.g., 2.4 and 60 GHz bands). Instead, the first carrier signal only has to be 1.4 GHz (2.4 GHz minus 1.0 GHz) and the second carrier frequency only has to be 59 GHz (60 GHz minus 1.0 GHz).

When signals are received by the system 600, the signals are routed from the antenna 647 to the receiver circuitry 601 by selectively controlling switch 646. The signals are then routed through RF filter block 616 and passed on to the amplifier 613, which amplifies the signals. The signals are then band-pass filtered by either the higher band filter 611 or the lower band filter 619 by selectively controlling switches 612 and 610. The signals are then demodulated using mixer 609 and outputted to the amplifier 608. The amplifier 608 then amplifies the signals and the signals are either band-pass filtered by the higher band filter 606 or the lower band filter 621 by selectively controlling switches 607 and 605. The signals are then converted to digital signals using ADC 604 and outputted through output 622.

Figure 7:
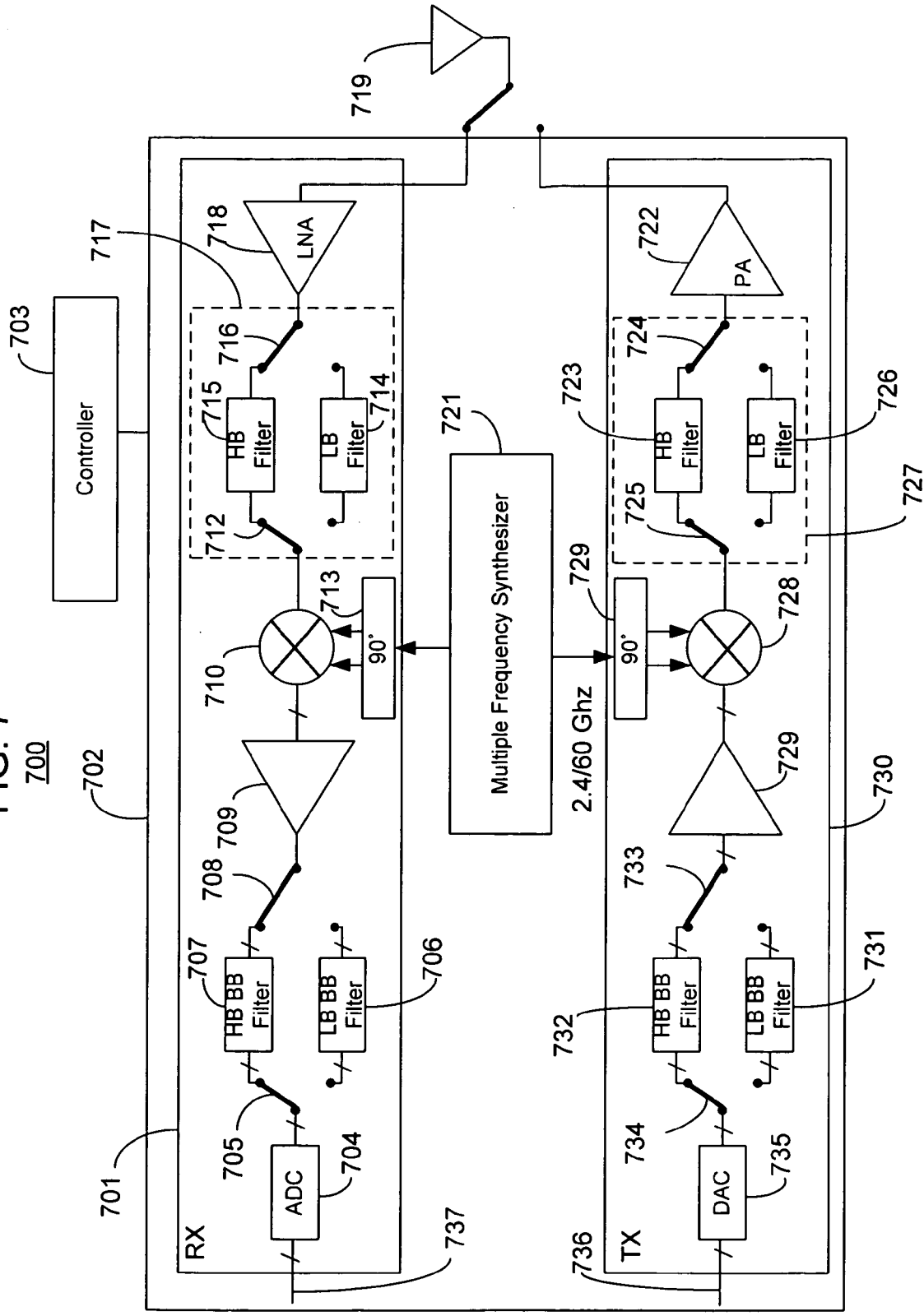
FIG. 7 Illustrates a third variation of the system 400 of FIG. 4 in accordance with various embodiments of the invention.

FIG. 7 depicts a third variation of the system 400 of FIG. 4 in accordance with various embodiments. For the embodiments, the system 700 is adapted to transmit and/or receive signals in a wireless network using a first frequency band (e.g., 2.4 GHz frequency band) and a second frequency band (e.g., 60 GHz frequency band). For purposes of this description, the system 700 may be referred to as a direct conversion system. The system 700 includes a controller 703, a transceiver circuitry 702, and an antenna 719, coupled to each other as shown. The transceiver circuitry 702 further includes a receiver circuitry 701, a transmitter circuitry 730, and a multiple frequency synthesizer 721, coupled to each other as shown. In alternative embodiments, the multiple frequency synthesizer 721 may be replaced with a plurality of frequency synthesizers. Note that although only one antenna 719 is depicted, in alternative embodiments, multiple antennas or a plurality of multi-element antennas may be employed.

The receiver circuitry 701 and the transmitter circuitry 730 comprises assorted components including ADC 704, DAC 735, higher band baseband filters 707 and 732, lower band baseband filters 706 and 731, higher band RF filters 715 and 723, lower band RF filters 714 and 726, amplifiers 709, 718, 722, and 729, switches 705, 708, 712, 716, 733, 734, 724 and 725, mixers 710 and 728, and 90 degrees phase splitters 713 and 729, coupled to each other as shown. The transmitter circuitry 730 includes an input 736 and the receiver circuitry 701 includes an output 737. The input 736 may be adapted to receive in-phase and quadrature signals. Similarly, the output 737 may be adapted to output in-phase and quadrature signals. The transmitter and receiver circuitries 730 and 701 each include RF filter blocks 727 and 717.

For the embodiments, the multiple frequency synthesizer 721 generates a 2.4 GHz carrier signal and a 60 GHz carrier signal. In alternative embodiments, however, the multiple frequency synthesizer 721 may generate carrier signals that have other frequencies.

The controller 703 is adapted to control the various switches of the transceiver circuitry 702 as well as the multiple frequency synthesizer 721 in order to transmit or receive signals using the first and the second frequency bands. For example, when the transmitter circuitry 730 is to transmit a first control signal through the first frequency band, the controller 703 will control the multiple frequency synthesizer 721 to provide to the 90 degree phase splitter 729 a 2.4 GHz carrier signal to modulate the control signal to be transmitted. The controller 703 will further control the switches 725 and 724 of the RF filter block 727 to couple with the lower band RF filter 726 thus routing or coupling the first control signal to the lower band filter 726 to be transmitted through the first frequency band. On the other hand, if a second control signal or data signal is to be transmitted through the second frequency band, the controller 703 will control the multiple frequency synthesizer 721 to provide to the 90 degrees phase splitter 729 a 60 GHz carrier signal to modulate the second control signal or data signal to be transmitted. The controller 703 will further control the switches 725 and 724 of the RF filter block 727 to couple with the higher band RF filter 723 thus routing or coupling the second control signal or the data signal to the higher band RF filter 723 to be transmitted through the second frequency band. Likewise, on the receiver side, the controller 703 may control the multiple frequency synthesizer 721 and switches 712 and 716 in order to properly channel (i.e., through higher band RF filter 715 or lower band RF filter 714) and demodulate the signals (e.g., first control signal, second control signal, and/or data signals) received through the first and the second frequency bands.

Note that because the system 700 is a direct conversion system, signals to be transmitted through the transmitter circuitry 730 will be modulated only once regardless of whether the signals are to be transmitted through the first or the second frequency band. Similarly, signals to be received by the receiver circuitry 701 will only be demodulated only once regardless of whether the signals were received through the first or the second frequency band.

Figure 8:
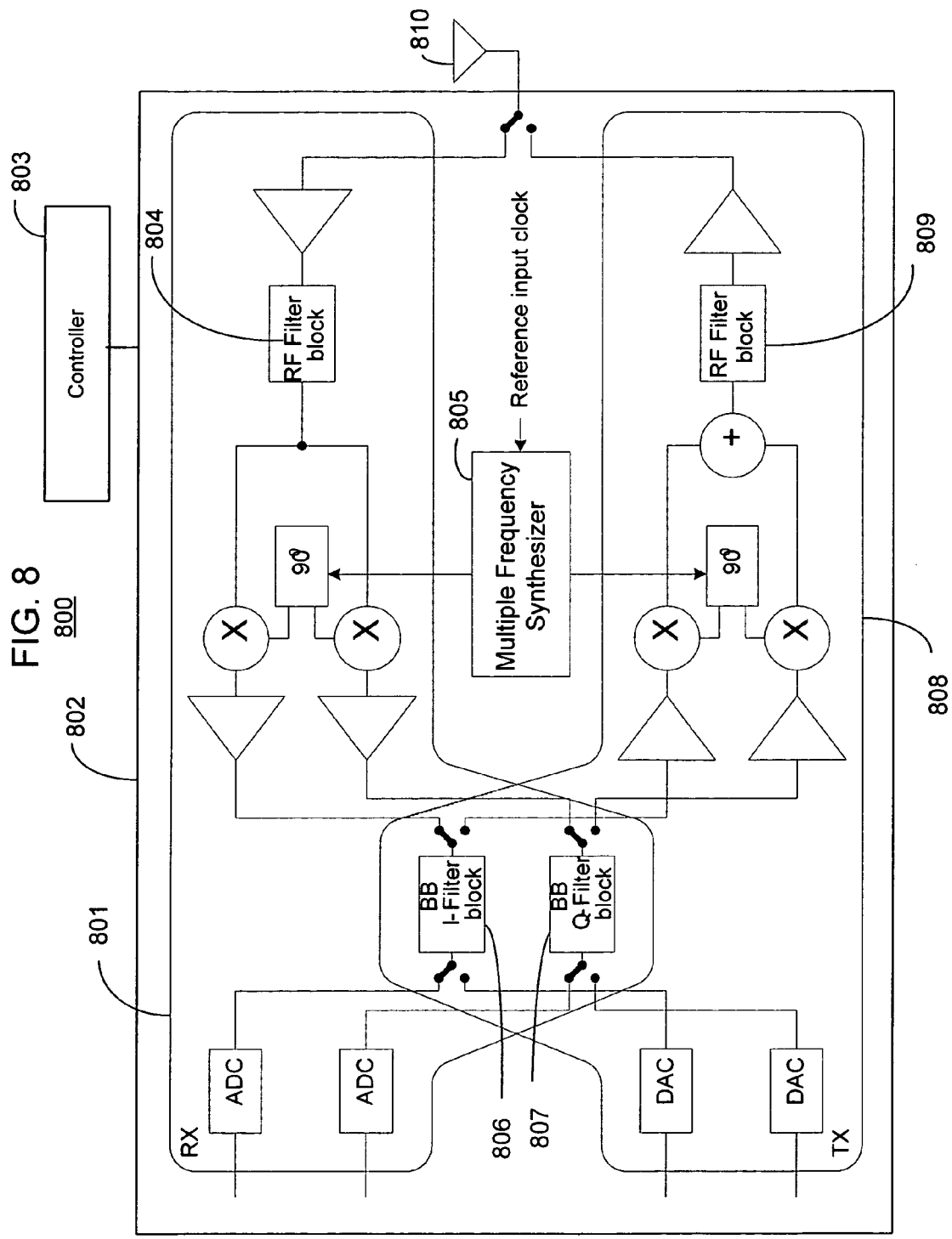
FIG. 8 illustrates a fourth variation of the system 400 of FIG. 4 in accordance with various embodiments of the invention.

FIG. 8 illustrates a fourth variation of the system 400 of FIG. 4 in accordance with various embodiments. For the embodiments, the system 800 is adapted to transmit and/or receive signals using a first and a second frequency band, wherein the first frequency band being a lower frequency band such as the 2.4 GHz band, and the second frequency band being a higher frequency band such as the 60 GHz band. The system 800 includes a controller 803, a transceiver circuitry 802, and a multiple frequency synthesizer 805, and an antenna 810, coupled to each other as shown. The transceiver circuitry 802 further comprises a receiver circuitry 801, a transmitter circuitry 808, and a multiple frequency synthesizer 805. The receiver circuitry 801 and the transmitter circuitry 808 each includes, among other things, RF filter blocks 804 and 809. The system 800 is similar to the system 700 of FIG. 7 in that both are direct conversion systems. However, in system 800, the receiver circuitry 801 and the transmitter circuitry 808 share a baseband in-phase filter block 806 and a baseband quadrature filter block 807.

The RF filter block 804 for the receiver circuitry 801 is a dedicated filter block for reception signals received through the first and the second frequency band while the RF filter block 809 is a dedicated filter block for transmission signals for transmitting through the first and the second frequency band. Each of the RF filter blocks 804 and 809 may include various components such as switches and higher and lower band RF filters as previously described in order to accommodate for signals received or transmitted through the first and the second frequency band.

Functionally, the controller 803 may control the multiple frequency synthesizer 805 and the RF filter blocks 804 and 809 to selectively transmit or receive signals using the first or the second frequency band similar to the system 700 of FIG. 7. That is, the controller 803 may control the multiple frequency synthesizer 805 to generate, for example, a 2.4 GHz or a 60 GHz carrier signal depending upon whether the 2.4 or the 60 GHz frequency band is to be used for transmitting or receiving signals. Thus, when a first control signal is to be transmitted or received in the first frequency band, the controller 803 may control the multiple frequency synthesizer 805 to generate a 2.4 GHz carrier signal. On the other hand if a second control signal or a data signal is to be transmitted or received in the second frequency band, the controller 803 may control the multiple frequency synthesizer 805 to generate a 60 GHz carrier signal. Further, the controller 803 may control the RF filter blocks 804 and 809 to selectively configure the RF filter blocks 804 and 809 such that they are properly configured to filter the signals received or transmitted through the first or the second frequency band.

Figure 9:
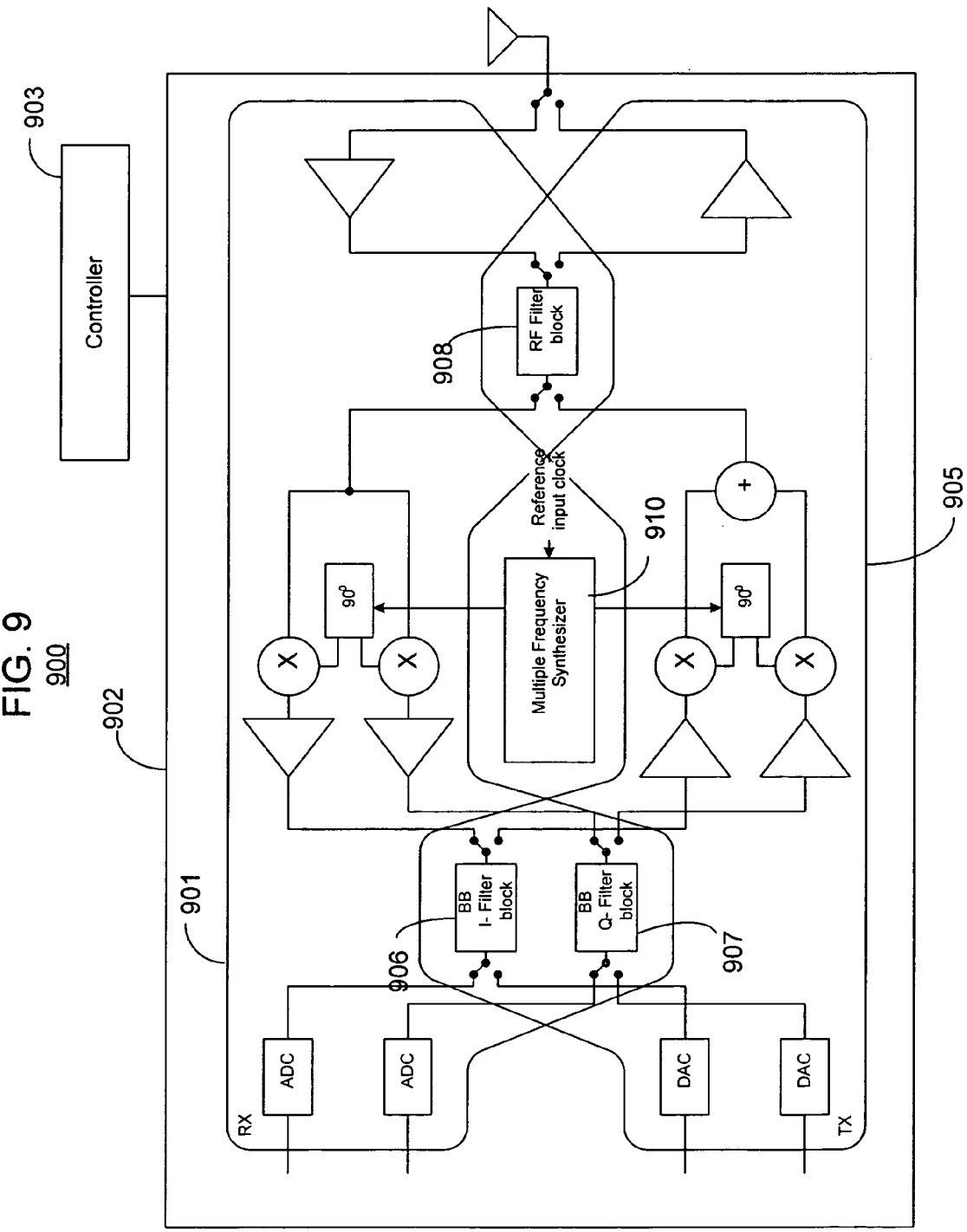
FIG. 9 illustrates a fifth variation of the system 400 of FIG. 4 in accordance with various embodiments of the invention.

FIG. 9 depicts a fifth variation of the system 400 of FIG. 4 in accordance with various embodiments. The system 900 is another type of direct conversion system similar to the system 800 of FIG. 8. In particular, the receiver circuitry 901 and the transmitter circuitry 905 share a baseband in-phase filter block 906 and a baseband quadrature filter block 907. However, unlike the system 800 of FIG. 8, the receiver circuitry 901 and the circuitry 905 also share a common RF filter block 908. The controller 903 may control at least the multiple frequency synthesizer 910 and the RF filter block 908 in order to transmit or receive signals using a first or a second frequency band. In particular, the RF filter block 908 may be controlled by the controller 903 to filter signals to be transmitted or received through either the first or the second frequency band.

Although various embodiments have been illustrated and described herein for purposes of description of the preferred embodiment, it will be appreciated by those of ordinary skill in the art that a wide variety of additional alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus, comprising:
a radio frequency (RF) filter block to selectively transmit or receive signals in a wireless network using a selected one of a first frequency band or a second frequency band, the first frequency band being an Industrial, Scientific, Medical (ISM) or Universal National Information Infrastructure (UNII) band and the second frequency band being a millimeter wave (mmWave) band, wherein the RF filter block comprises:
a first RF filter to pass filter a control signal for transmission or receipt in the first frequency band;
a second RF filter to pass filter a data signal for transmission or receipt in the second frequency band; and
a switch to selectively couple the control signal to the first RF filter or the data signal to the second RF filter; and
a controller coupled to the RF filter block to control the RF filter block to select the first frequency band to transmit or receive the control signal to facilitate initial communication by the apparatus in the wireless network, said transmit or receive of the control signal to subsequently enable the controller to control the RF filter block to select the second frequency band to transmit or receive the data signal.

2. The apparatus of claim 1, wherein said RF filter block further comprises a mixer coupled to the second RF filter to modulate or demodulate a data signal to be pass filtered by the second RF filter with a carrier signal to correspondingly facilitate said transmit or receive using the second frequency band.

3. The apparatus of claim 2, wherein said carrier signal is greater than about 20 GHz.

4. The apparatus of claim 1, wherein said RF filter block further comprises a mixer coupled to the switch to selectively provide or receive either said control or data signal to or from the switch, to facilitate said transmit or receive using the first and the second frequency bands, the mixer adapted to modulate or demodulate the control or data signal with a carrier signal having a first or a second frequency in the first or second frequency band, respectively.

5. The apparatus of claim 4, further comprising one or more frequency synthesizers coupled to the mixer to provide the carrier signals having the first and second frequencies.

6. The apparatus of claim 5, wherein said one or more frequency synthesizers are adapted to provide a first carrier signal having a frequency that is less than about 20 GHz and a second carrier signal having a frequency that is greater than about 20 GHz.

7. The apparatus of claim 1, wherein said apparatus further comprises another similarly constituted RF filter block coupled to the controller, with a first of the two RF filter blocks dedicated to said receiving of signals in the wireless network in said first or second frequency bands, and a second of the two RF filter blocks dedicated to said transmitting of signals in the wireless network in said first or second frequency bands, the controller respectively controlling the two RF filter blocks to select the first frequency band to transmit or receive a first control signal to facilitate initial communication by the apparatus in the wireless network using the second frequency band, to select the second frequency band to transmit or receive a second control signal to further facilitate communication by the apparatus using the second frequency band.

8. The apparatus of claim 1, further comprising one or more frequency synthesizers coupled to the RF filter block to selectively provide to the RF filter block a carrier signal in said first or second frequency band to facilitate said transmit or receive signals using the first and second frequency bands.

9. The apparatus of claim 8, wherein said one or more frequency synthesizers are adapted to provide a first carrier signal with a frequency that is less than about 20 GHz and a second carrier signal with a frequency that is greater than about 20 GHz.

10. An apparatus, comprising:
a radio frequency (RF) filter block to selectively transmit or receive signals in a wireless network using a selected one of a first frequency band or a second frequency band, the first frequency band being an Industrial, Scientific, Medical (ISM) or Universal National Information Infrastructure (UNII) band and the second frequency band being a millimeter wave (mmWave) band;
a pair of first and second inputs or a pair of first and second outputs coupled to the RF filter block to receive or output a pair of first and second signals, the first input or output adapted to receive or output in-phase signals, and the second input or output adapted to receive or output quadrature signals; and
a controller coupled to the RF filter block to control the RF filter block to select the first frequency band to transmit or receive a control signal to facilitate initial communication by the apparatus in the wireless network, said transmit or receive of the control signal to subsequently enable the controller to control the RF filter block to select the second frequency band to transmit or receive the data signal.

11. The apparatus of claim 10, further comprising a pair of first and second digital-to-analog converters (DAC) or a pair of first and second analog-to-digital converters (ADC) coupled to the pair of first and second inputs or the pair of first and second outputs, respectively, to convert digital signals received through the pair of first and second inputs to analog signals or to convert analog signals to digital signals prior to outputting on the pair of first and second outputs.

12. The apparatus of claim 11, further comprising a first and a second filter-and-amplifier pair correspondingly coupled to the first and second DACs or to the first and second ADCs to pass filter and amplify signals outputted by the DACs or to be received by the ADCs.

13. The apparatus of claim 12, further comprising a first and a second mixer coupled to the first and the second filter-and-amplifier pair, respectively, to correspondingly modulate or demodulate signals to be outputted or received by the first and the second filter-and-amplifier pair with a first and a second carrier signal, respectively, the first and second carrier signals to be 90 degrees out-of-phase with each other.

14. The apparatus of claim 13, further comprising a 90 degree phase splitter coupled to first and second mixers to provide the first and second carrier signals to the first and second mixers, based on a third carrier signal.

15. The apparatus of claim 13, further comprising one or more frequency synthesizers coupled to the 90 degree phase splitter to provide the third carrier signal to the 90 degree phase splitter.

16. The apparatus of claim 15, wherein said one or more frequency synthesizers are further coupled to the RF filter block to provide to the RF filter block a fourth carrier signal, the fourth carrier signal having a higher frequency than the third carrier signal.

17. An apparatus, comprising:

circuitry including a radio frequency (RF) filter block to selectively transmit or receive signals in a wireless network using a selected one of a first frequency band or a second frequency band, the first frequency band being an Industrial, Scientific, Medical (ISM) or Universal National Information Infrastructure (UNII) band and the second frequency band being a millimeter wave (mm-Wave) band;

one or more frequency synthesizers coupled to the circuitry to provide a first and a second carrier signal to the circuitry, the first carrier signal having a frequency lower than frequency of the second carrier signal, the first and the second carrier signal to modulate or demodulate signals to be transmitted or received through the first and second frequency bands, respectively; and a controller coupled to the RF filter block to control the RF filter block to select the first frequency band to transmit or receive a control signal to facilitate initial communication by the apparatus in the wireless network, said transmit or receive of the control signal to subsequently enable the controller to control the RF filter block to select the second frequency band to transmit or receive the data signal.

18. The apparatus of claim 17, wherein said controller is further coupled to the one or more frequency synthesizers to control the one or more frequency synthesizers to select the first carrier signal to modulate or demodulate the control signal.

19. The apparatus of claim 18, wherein said controller is further adapted to control the one or more frequency synthesizers to select the second carrier signal to modulate or demodulate signals to be transmitted or received during said subsequent communications by the apparatus.

20. The apparatus of claim 17, wherein said one or more frequency synthesizers are further adapted to provide to the circuitry a third carrier signal, the third carrier signal to facilitate further modulation or demodulation of signals to be transmitted or received through the first and second frequency bands.

21. The apparatus of claim 20, wherein said circuitry further comprises a 90 degrees phase splitter coupled to the one or more frequency synthesizers to provide two carrier signals from the third carrier signal that are 90 degrees out-of-phase with each other, to further modulate or demodulate the signals to be transmitted or received through the first and second frequency bands.

22. The apparatus of claim 17 wherein said one or more frequency synthesizers to provide a first carrier signal to the circuitry that is an intermediate frequency (IF) carrier signal to modulate or demodulate signals transmitted or received through the first frequency band.

23. A system, comprising:

a radio frequency (RF) filter block to selectively transmit or receive signals in a wireless network using a selected one of a first frequency band or a second frequency band, the first frequency band being an Industrial, Scientific, Medical (ISM) or Universal National Information Infrastructure (UNII) band and the second frequency band being a (millimeter wave) mmWave band; and a controller coupled to the RF filter block to control the RF filter block to select the first frequency band to transmit or receive control signals and to select the second frequency band to transmit or receive data signals in the wireless network, wherein said system further comprises another similarly constituted RF filter block coupled to the controller, with a first of the two RF filter blocks dedicated to said receiving of signals in the wireless network in said first or second frequency bands, and a second of the two RF filter blocks dedicated to said transmitting of signals in the wireless network in said first or second frequency bands, the controller respectively controlling the two RF filter blocks to select the first frequency band to transmit or receive a first control signal to facilitate initial communication by the system in the wireless network using the second frequency band, to select the second frequency band to transmit or receive a second control signal to further facilitate communication by the system using the second frequency band.

* * * * *

UNITED STATES PATENT AND TRADEMARK OFFICE
CERTIFICATE OF CORRECTION

PATENT NO. : 7,653,163 B2
APPLICATION NO. : 11/394600
DATED : January 26, 2010
INVENTOR(S) : Sadri et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 794 days.

Signed and Sealed this

Twenty-eighth Day of December, 2010

David J. Kappos
*Director of the United States Patent and Trademark Office*